US008464462B2

United States Patent
Streckert

(10) Patent No.: US 8,464,462 B2
(45) Date of Patent: Jun. 18, 2013

(54) FISHING ROD SUPPORT SYSTEM

(76) Inventor: Hans H. Streckert, River Grove, IL (US)

( * ) Notice: Subject to any disclaimer, the term of this patent is extended or adjusted under 35 U.S.C. 154(b) by 0 days.

(21) Appl. No.: 13/299,674

(22) Filed: Nov. 18, 2011

(65) Prior Publication Data

US 2013/0125447 A1    May 23, 2013

(51) Int. Cl.
*A01K 97/10*    (2006.01)
(52) U.S. Cl.
USPC ............................................. 43/21.2
(58) Field of Classification Search
USPC ............ 43/21.2; 248/511, 514–515, 519–520, 248/523, 534–536, 538–539, 541
See application file for complete search history.

(56) References Cited

U.S. PATENT DOCUMENTS

| | | | | |
|---|---|---|---|---|
| 291,248 | A * | 1/1884 | West | 269/249 |
| 2,238,127 | A * | 4/1941 | Nissen | 43/21.2 |
| 2,426,881 | A * | 9/1947 | Johnson et al. | 248/515 |
| 4,397,113 | A * | 8/1983 | Pinson | 43/15 |
| 4,425,729 | A * | 1/1984 | Miyamae | 43/21.2 |
| 4,565,025 | A * | 1/1986 | Behrle | 43/21.2 |
| 4,603,500 | A * | 8/1986 | Harrison, Sr. | 43/21.2 |
| 5,088,224 | A * | 2/1992 | Gutierrez | 43/21.2 |
| 5,295,321 | A | 3/1994 | Matura | |
| 5,365,689 | A * | 11/1994 | Holliman | 43/21.2 |
| 5,791,613 | A * | 8/1998 | Grable | 248/200.1 |
| 5,871,196 | A * | 2/1999 | Martelli | 248/514 |
| 5,996,958 | A * | 12/1999 | Baynard et al. | 248/512 |
| 6,584,723 | B2 * | 7/2003 | Elmore | 43/4.5 |
| 6,898,893 | B1 | 5/2005 | Mukdaprakorn | |
| 6,962,018 | B1 * | 11/2005 | King | 43/21.2 |
| 7,377,069 | B2 | 5/2008 | Morris | |
| 7,774,973 | B2 | 8/2010 | Carnevali | |
| 7,845,106 | B2 * | 12/2010 | Norman | 43/21.2 |
| 7,908,786 | B2 | 3/2011 | Bailey | |
| 7,937,883 | B2 | 5/2011 | Roemer et al. | |
| 7,975,426 | B2 | 7/2011 | Cabrera et al. | |

* cited by examiner

*Primary Examiner* — David Parsley
(74) *Attorney, Agent, or Firm* — The Thompson Law Office, P.C.; Lawrence E. Thompson, Esq.

(57) ABSTRACT

Disclosed herein is a portable mountable fishing rod support system. The system may support a rod having a handle and a finger support above a fixed structure. The system may include a grip base, a vertical support, and a rod cradle. The base may include an L-shaped bracket, a vertical wall, fasteners securing the L-shaped bracket to the vertical wall, and a plunger for removably securing the base to the fixed structure. The vertical support may include a hollowed cylinder, a bolt, and a pin for adjustably securing the hollowed cylinder to the L-shaped bracket. The rod cradle may include a central opening to accept the handle and may have a finger notch to accept the finger support when the handle is inserted into the opening. The rod cradle may be secured in positions around the vertical support by loosening and then securing the vertical support to the L-shaped bracket.

3 Claims, 6 Drawing Sheets

FIG. 4A

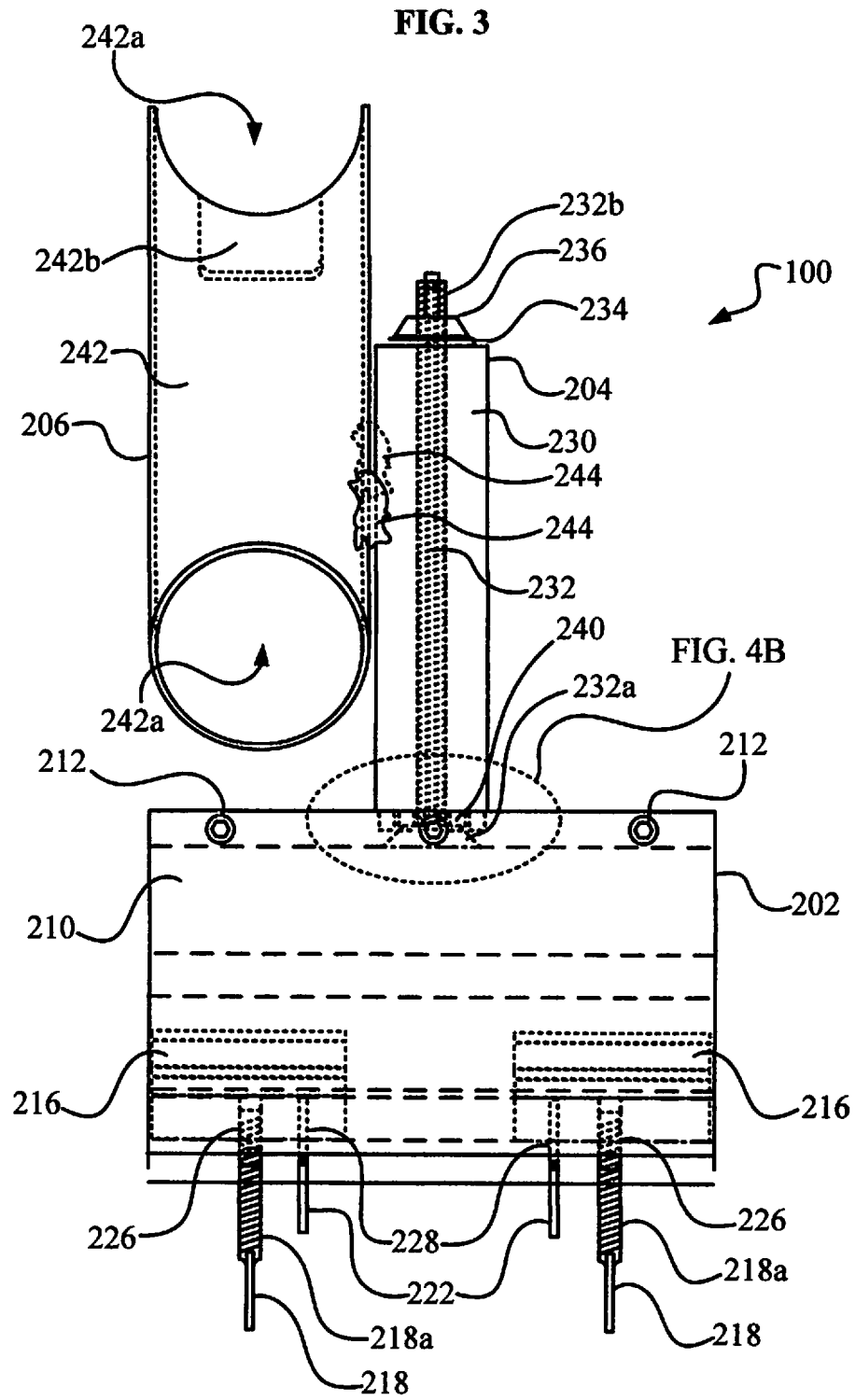

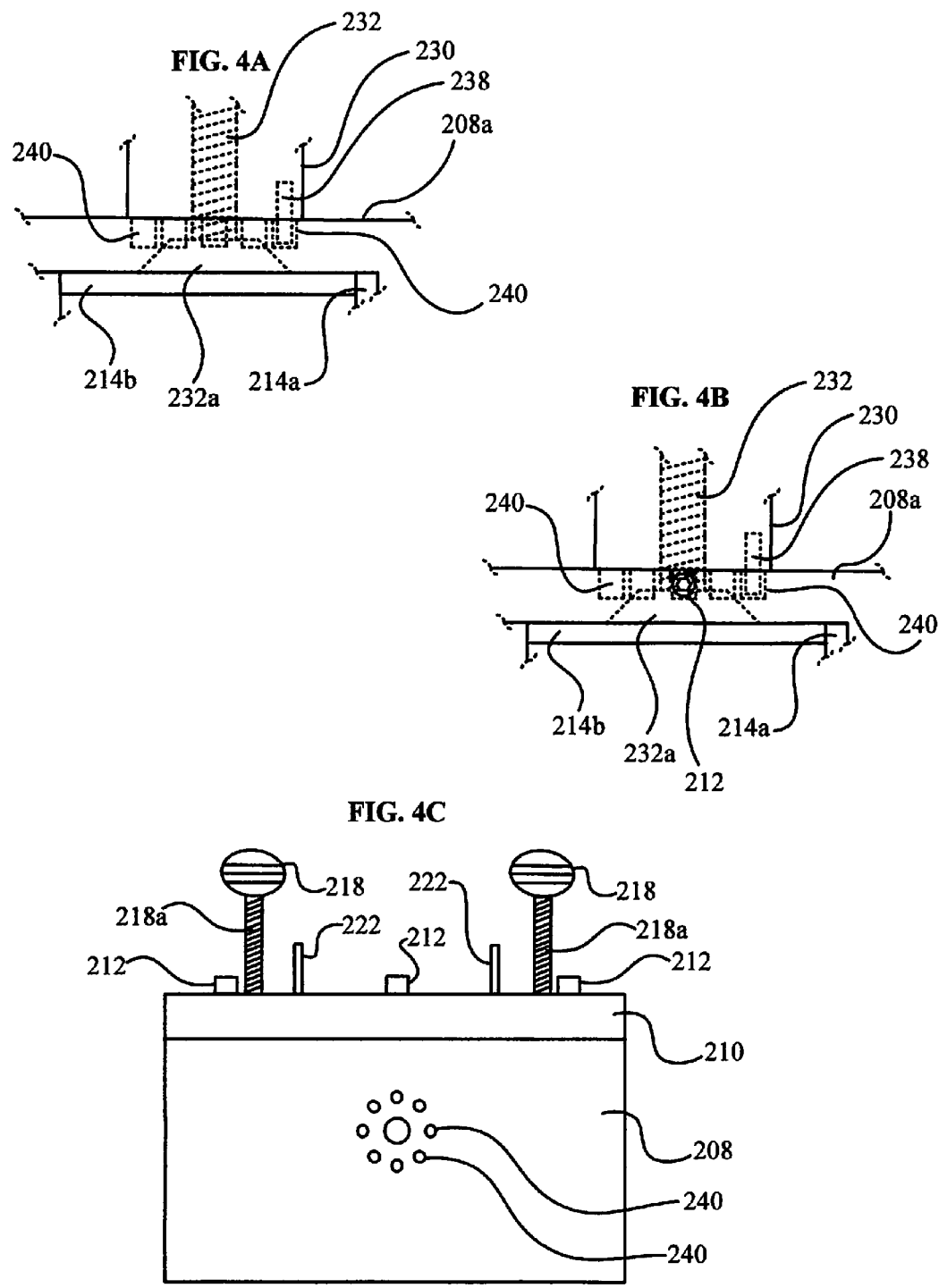

FISHING ROD SUPPORT SYSTEM

BACKGROUND

1. Field

This invention is generally related to fishing rod support systems, and more particularly to a portable mountable fishing rod support system.

2. Background

Systems for holding fishing rods have been disclosed in the past. Such systems are desirable because they allow a fisherman to tend to other tasks while presenting the sought after fish with an enticement for placing itself on a hook that is secured to the fishing rod. Fishing rod holders are also desirable because they allow a fisherman to simultaneously use multiple rods for efficiently presenting numerous enticements to the sought after fish in a plurality of locations around the fisherman. Systems for holding fishing rods that have been disclosed in the past, which are fully incorporated herein, include: U.S. Pat. No. 7,774,973, issued to Carnevali on Aug. 17, 2010; U.S. Pat. No. 7,377,069, issued to Morris on May 27, 2008; U.S. Pat. No. 6,898,893, issued to Mukdaprakorn on May 31, 2005; and U.S. Pat. No. 5,295,321, issued to Matura on Mar. 22, 1994.

However, past systems for holding fishing rods have failed to provide a portable, convenient and efficient system for securely holding the fishing rods, while allowing rods to be efficiently targeted in a plurality of directions, and while being capable of being located, and relocated, quickly, efficiently and securely. Therefore, there is a need for new fishing rod support systems that efficiently allows for removal and relocation of the fishing rod support system from a fixed structure, such as a boat rail, dock rail, and/or pole.

SUMMARY

Disclosed herein is a new and improved system for a portable mountable fishing rod support system. The fishing rod support system may support a fishing rod above a fixed structure, such as a boat rail. The fishing rod may have a handle and a finger support. In accordance with one aspect of the approach, the fishing rod support system may include a rail grip base, a vertical support, and a rod cradle. The rail grip base may include an L-shaped bracket, a vertical wall, one or more fasteners securing the L-shaped bracket to the vertical wall, and a plunger for removably securing the rail grip base to the boat rail. The vertical support may include a hollowed cylinder, a bolt, and a means for adjustably securing the hollowed cylinder to the L-shaped bracket. The rod cradle may include a central opening sized to accept the handle and have a finger notch configured to accept the finger support when the handle is inserted into the central opening. The rod cradle may be secured in a plurality of positions around the vertical support by loosening and then securing the vertical support to the L-shaped bracket using the means for adjustably securing the hollowed cylinder to the rail grip support.

In an alternative arrangement, the fishing rod support system may include a grip base, a vertical support, and a rod cradle. The grip base may be configured to encompass a fixed structure on at least three sides and have a means for securing the grip base to the fixed structure. The vertical support may be secured to the grip base and may be lockably rotatable and the rod cradle may have a finger notch.

Other systems, methods, aspects, features, embodiments and advantages of the system for a portable mountable fishing rod support disclosed herein will be, or will become, apparent to one having ordinary skill in the art upon examination of the following drawings and detailed description. It is intended that all such additional systems, methods, aspects, features, embodiments and advantages be included within this description, and be within the scope of the accompanying claims.

BRIEF DESCRIPTION OF THE DRAWINGS

FIG. 3 shows a front view of the fishing rod support system of FIG. 1.

FIG. 4A shows an enlarged side view of the base of the vertical support and a middle portion of a horizontal portion of the rail grip base of FIG. 2.

FIG. 4B shows an enlarged front view of the base of the vertical support and a middle portion of a horizontal portion of the rail grip base of FIG. 2.

FIG. 4C shows a top view of the rail grip base of FIG. 2.

Figure 1:
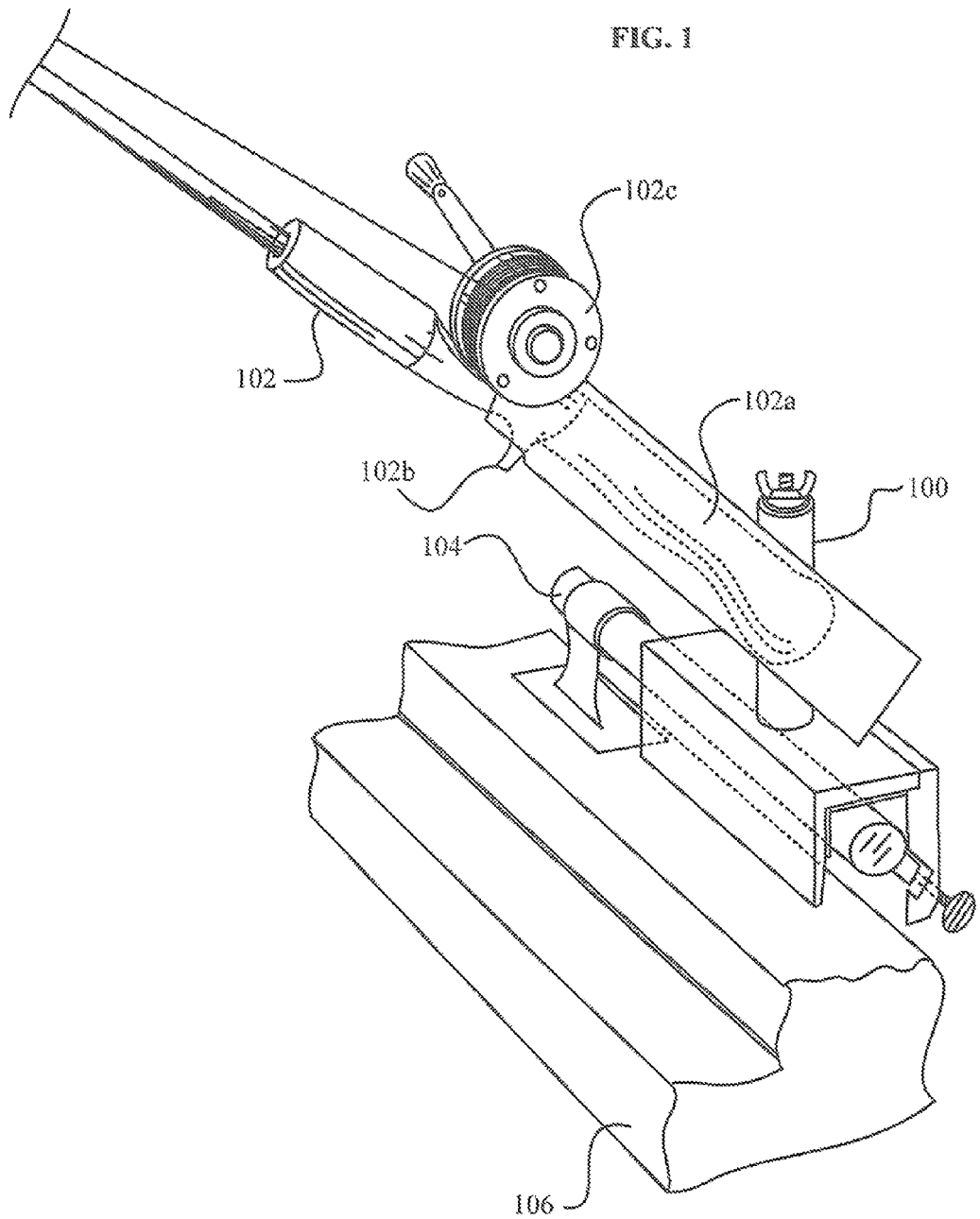
FIG. 1 shows a perspective view of one embodiment of a fishing rod support system, an exemplar fishing rod, and an exemplar round boat rail.

It is to be understood that the drawings are solely for purpose of illustration. Furthermore, the components in the figures are not necessarily to scale, emphasis instead being placed upon illustrating the principles of the system disclosed herein. In the figures, like reference numerals designate corresponding parts throughout the different views.

DETAILED DESCRIPTION

The following detailed description, which references to and incorporates the drawings, describes and illustrates one or more specific embodiments. These embodiments, offered not to limit but only to exemplify and teach, are shown and described in sufficient detail to enable those skilled in the art to practice what is claimed. Thus, for the sake of brevity, the description may omit certain information known to those of skill in the art.

FIG. 1 is a perspective view of one embodiment of a fishing rod support system 100, an exemplar fishing rod 102, and an exemplar round boat rail 104. The boat rail 104 may be secured to a fixed structure, such as a gunwale 106 of a boat (remainder of the boat not shown). However, the fishing rod support system 100 is not limited to any particular application and may also be employed on shore, or from a deck, or any location having a stable support such as the exemplar boat rail 104, and may be used with horizontal and vertical poles and rails. The portable and mountable fishing rod support system 100 allows a user to transport the system 100 to the location, or boat, that the user wishes to use the system 100, and allows the user to adjust the position of the system 100 to maximize the user's convenience, for example, and to maximize the user's chances of catching one or more fish (not shown). The portable and mountable fishing rod support system 100 also allows a user to quickly remove the system when a cover (not shown) is to be placed on a boat, and to quickly re-secure the system after the cover is removed, without requiring the use of tools.

Fishing rod support system 100 allows the user to conveniently locate, and relocate, the fishing rod support system 100 without the need for specialized tools and without the need to drill holes or affix any permanent structure to the boat rail 104 or other fixed structure.

Figure 2:
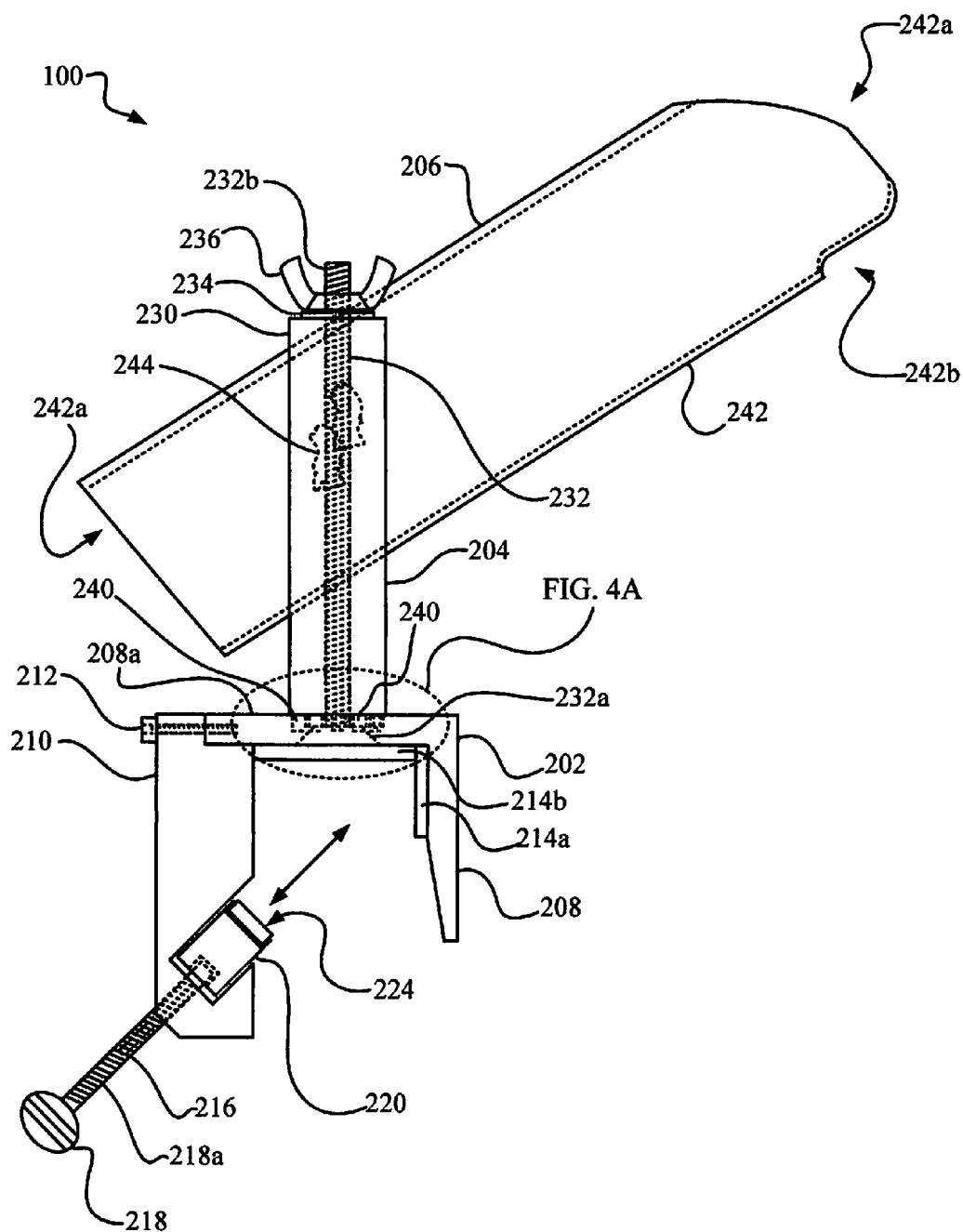
FIG. 2 shows a side view of the fishing rod support system of FIG. 1, including a rail grip base, a vertical support, and a rod cradle.

FIG. 2 is a side view of the fishing rod support system 100 of FIG. 1. Fishing rod support system 100 may include a rail grip base 202, a vertical support 204, and a rod cradle 206. Rail grip base 202 may include an L-shaped bracket 208 and a vertical wall 210. L-shaped bracket 208 may include a rubberized wall pad 214a and a rubberized ceiling pad 214b in order to provide a non-slip grip upon the boat rail 104.

FIG. 3 is a front view of the fishing rod support system 100 of FIG. 1. As shown in FIG. 2 and FIG. 3, L-shaped bracket 208 and vertical wall 210 may be rigidly secured to each other using one or more fasteners 212, such as, but not limited to, recessed hex fasteners. Vertical wall 210 may include one or more plungers 216. Plungers 216 may include a thumb screw 218, a plunger base 220, and a guide pin 222. Thumb screw 218 may be secured to plunger base 220 in such a manner that a threaded stem 218a of thumb screw 218 may be rotated, while remaining secured to plunger base 220 while plunger base 220 does not rotate. A rubberized face pad 224 may be secured to plunger base 220 in order to provide a non-slip grip upon the boat rail 104, and to prevent damage to the boat rail, when thumb screw 218 is advanced through plunger threads 226 of the vertical wall 210.

As shown in FIG. 1, fishing rod support system 100 may be placed over boat rail 104. By rotating and advancing thumb screw 218, rubberized face 224 of plunger base 220 may be advanced to make contact with boat rail 104. This action may also force contact between boat rail 104 and rubberized wall pad 214a and a rubberized ceiling pad 214b. Guide pin 222, by being secured to plunger base 220 and freely passing through circular passage 228 in vertical wall 210, may allow plunger base 220 to advance toward boat rail 104 without rotating. Thus, by rotating and advancing thumb screw 218, rail grip base 202 may be securely attached to boat rail 104 and may provide a solid base for vertical support 204.

Vertical support 204 may include a hollowed cylinder 230, a bolt 232, a washer 234, and a wing nut 236. Although hollowed cylinder 230 is not limited to any particular length and may be sized according to the anticipated needs of the user, the hollowed cylinder 230 may be 2.75 inches in length. A head portion 232a of bolt 232 may be recessed into a horizontal portion 208a of L-shaped bracket 208. A threaded end 232b of bolt 232 may protrude from hollowed cylinder 230 and allow washer 232 and wing nut 234 to secure vertical support 204 to rail grip base 202.

FIG. 4A shows an enlarged view of the base of the vertical support 204 and a middle portion of the horizontal portion 208a of L-shaped bracket 208 from the same perspective as FIG. 2. FIG. 4B shows an enlarged view of the base of the vertical support 204 and a middle portion of the horizontal portion 208a of L-shaped bracket 208 from the same perspective as FIG. 3. FIG. 4C shows a top view of the rail grip base 204, including a top view of the horizontal portion 208 of the L-shaped bracket 208.

As shown in FIG. 4A and FIG. 4B, hollowed cylinder 230 may included an extended pin 238 that may be sized to fit into one of a plurality of hollows 240 in the horizontal portion 208a of L-shaped bracket 208. The combination of pin 238 and hollows 240 allows vertical support 204 to rotate when wing nut 236 is loosened and hollowed cylinder 230 is slightly separated from horizontal portion 208a. Rotating hollowed cylinder 230 until pin 238 is aligned with one of the hollows 240, and then retightening wing nut 236 allows the user to conveniently lock vertical support 204 into a plurality of positions as determined by the particular fishing conditions and/or the configuration of the boat rail 104 compared to the anticipated location of the one or more fish.

Returning to FIG. 2 and FIG. 3, rod cradle 206 may include a tube 242. Although rod cradle 206 is not limited to any particular length, rod cradle may be 6.0 inches long. A central opening 242a of tube 242 may be sized to accept a handle 102a (see FIG. 1) of fishing rod 102. Although not limited to any particular sized handle 102a, convenient sizes of for central opening 242a include circumferences of 1 and 1.25 inches. Tube 242 may also include a finger notch 242b for accepting a finger support 102b (see FIG. 1) part of the fishing rod 102. Placing finger support 102b into finger notch 242b may allow a reel 102c (see FIG. 1) of rod 102 to remain in an upright position. Tube 242 may be secured to vertical support 204 in a number of ways known to those having skill in the art, for example, but not limited to, through one or more welds 244.

Figure 5A:
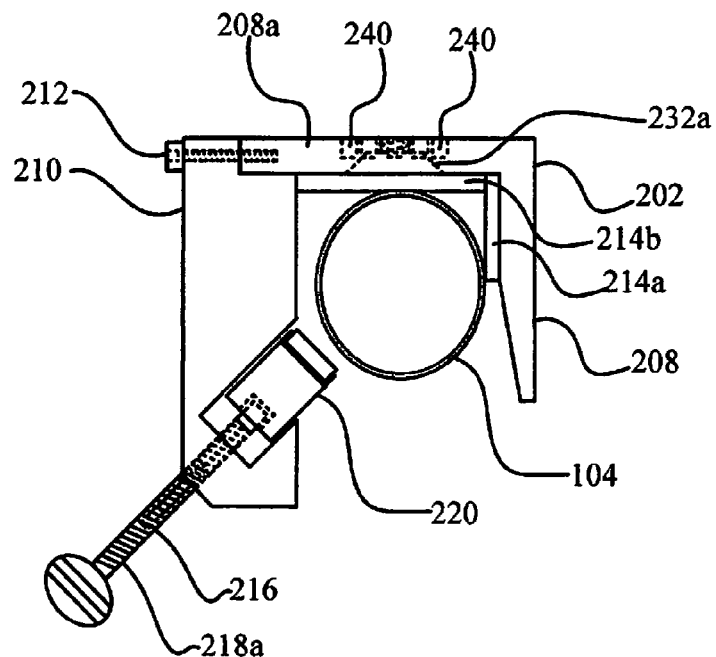
FIG. 5A shows a side view of the rail grip base of FIG. 2 secured to a round boat rail.
Figure 5B:
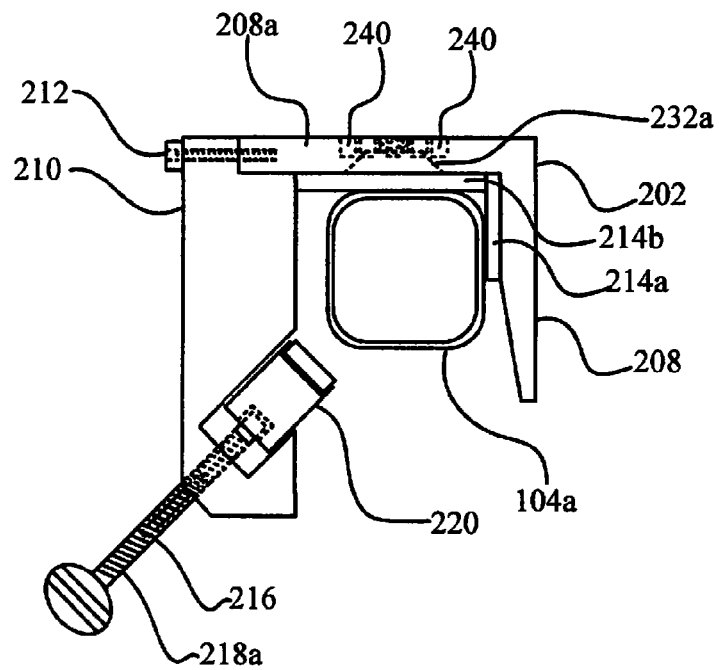
FIG. 5B shows a side view of the rail grip base of FIG. 2 secured to a square boat rail.
Figure 6:
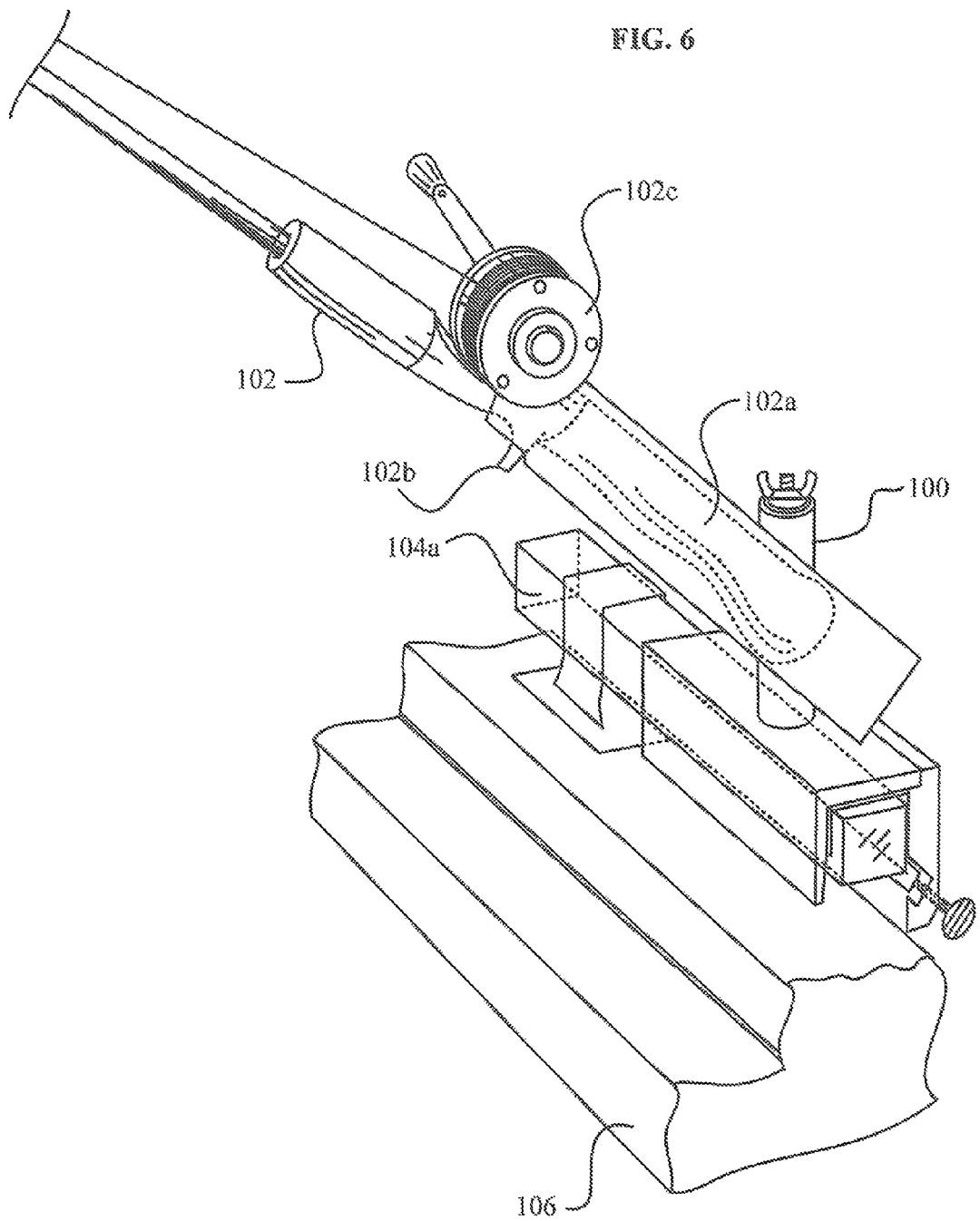
FIG. 6 shows a perspective view of the fishing rod support system and exemplar fishing rod of FIG. 1 and an exemplar square boat rail.

FIG. 5A is a side view of the rail grip base 202 secured to the round boat rail 104 of FIG. 1. FIG. 5B is a side view of the rail grip base 202 secured to the square boat rail 104a. As shown in FIG. 5A and FIG. 5B, the fishing rod support system 100 is not limited to boat rails or poles of any particular size or dimension. FIG. 6 shows a perspective view of the fishing rod support system 100 and exemplar fishing rod 102 of FIG. 1 and the exemplar square boat rail 104a.

As illustrated and disclosed herein, in one embodiment, a fishing rod support system, such as but not limited to fishing rod support system 100, may be employed to support a fishing rod, such as, but not limited to, fishing rod 102, above a fixed structure, such as but not limited to a boat rail 104 or a pole. The fishing rod may have a handle, such as, but not limited to, handle 102a, and a finger support, such as, but not limited to, finger support 102b. The fishing rod support system may include a rail grip base, such as, but not limited to, rail grip base 202, a vertical support, such as, but not limited to, vertical support 204, and a rod cradle, such as but not limited to rod cradle 206. The rail grip base nay have an L-shaped bracket, such as but not limited to L-shaped bracket 208, a vertical wall, such as but not limited to vertical wall 210, one or more fasteners securing the L-shaped bracket to the vertical wall, such as but not limited to fasteners 212, and a plunger for removably securing the rail grip base to the boat rail, such as but not limited to plungers 216. The vertical support may include a hollowed cylinder, such as but not limited to hollowed cylinder 230, a bolt, such as but not limited to bolt 232, and a means for adjustably securing the hollowed cylinder to the L-shaped bracket, such as but not limited to the wing nut 236 associated with bolt 232 and L-shaped bracket 208. The rod cradle may have a central opening sized to accept the handle, such as but not limited to central opening 242a, and a finger notch, such as but not limited to finger notch 242b, configured to accept the finger support when the handle is inserted into the central opening. The rod cradle may be secured in a plurality of positions around the vertical support by loosening and then securing the vertical support to the L-shaped bracket using the means for adjustably securing the hollowed cylinder to the rail grip support.

In another embodiment, a fishing rod support system, such as but not limited to fishing rode support system 100, may be employed to support a fishing rod from a fixed structure, such as but not limited to a boat rail 104 or a pole, and may include a grip base, a vertical support, and a rod cradle. The grip base may be configured to encompass the fixed structure on at least three sides and may have a means for securing the grip base to the fixed structure. The vertical support may be secured to the grip base and may be lockably rotatable, for example but not limited to, by loosening wing nut 236, lifting vertical support 204, vertical support 234 until extended pin 238 aligns with one of the plurality of hollows 240, and tightening wing nut 236. The rod cradle, such as but not limited to rod cradle 206, may have a finger notch, such as but not limited to finger notch 242*b*.

The word "exemplary" is used herein to mean "serving as an example, instance, or illustration." Any embodiment or variant described herein as "exemplary" is not necessarily to be construed as preferred or advantageous over other embodiments or variants. All of the embodiments and variants described in this description are exemplary embodiments and variants provided to enable persons skilled in the art to make and use the invention, and not necessarily to limit the scope of legal protection afforded the appended claims.

The above description of the disclosed embodiments is provided to enable any person skilled in the art to make or use that which is defined by the appended claims. The following claims are not intended to be limited to the disclosed embodiments. Other embodiments and modifications will readily occur to those of ordinary skill in the art in view of these teachings. Therefore, the following claims are intended to cover all such embodiments and modifications when viewed in conjunction with the above specification and accompanying drawings.

What is claimed is:

1. A fishing rod support system for supporting a fishing rod above a fixed structure, the fishing rod having a handle and a finger support, the system comprising:
    a grip base, the grip base having an L-shaped bracket and a vertical wall, the L-shaped bracket having a vertical portion extending below a horizontal portion, one or more fasteners securing the L-shaped bracket to the vertical walk and one or more plungers for removably securing the grip base to the fixed structure, the horizontal portion having an upper surface, the upper surface having a plurality of hollows;
    a vertical support including a hollowed cylinder, a bolt, and a means for adjustably securing the hollowed cylinder to the L-shaped bracket, the hollowed cylinder having an extended pin configured to fit into one or more of the plurality of hollows; and
    a rod cradle having a central opening sized to accept the handle and having a finger notch configured to accept the finger support when the handle is inserted into the central opening,
    wherein the rod cradle is secured in a plurality of positions around the vertical support by loosening and then securing the vertical support to the L-shaped bracket while fitting the extended pin into one of the plurality of hollows.

2. The fishing rod support system of claim 1, wherein the one or more plungers includes a rubberized face.

3. The fishing rod support system of claim 1, wherein the grip base includes a rubberized pad.

\* \* \* \* \*